United States Patent
Lawrence

(10) Patent No.: US 7,070,526 B2
(45) Date of Patent: Jul. 4, 2006

(54) ACCESSORY DRIVE FOR DRIVING A BALANCE SHAFT

(75) Inventor: Howard J. Lawrence, Southampton (GB)

(73) Assignee: Perkins Engines Company Limited, Peterborough (GB)

( * ) Notice: Subject to any disclaimer, the term of this patent is extended or adjusted under 35 U.S.C. 154(b) by 280 days.

(21) Appl. No.: 10/471,678

(22) PCT Filed: Mar. 18, 2002

(86) PCT No.: PCT/GB02/01066

§ 371 (c)(1),
(2), (4) Date: Sep. 12, 2003

(87) PCT Pub. No.: WO02/075132

PCT Pub. Date: Sep. 26, 2002

(65) Prior Publication Data

US 2004/0084006 A1 May 6, 2004

(51) Int. Cl.
*F16H 7/02* (2006.01)
*F01L 1/02* (2006.01)
*F02B 67/06* (2006.01)

(52) U.S. Cl. .............................. 474/87; 474/84; 474/88; 123/90.31; 123/192.2; 123/198 R

(58) Field of Classification Search ............ 474/85–88, 474/84; 123/192.2, 572, 90.32, 90.31; 74/602–605, 74/375, 333, 411.5, 574
See application file for complete search history.

(56) References Cited

U.S. PATENT DOCUMENTS

| 4,095,579 | A | * | 6/1978 | Iwasa et al. | 123/192.2 |
| 4,696,267 | A | * | 9/1987 | Kohno et al. | 123/192.2 |
| 4,940,450 | A | | 7/1990 | Miyamura et al. | |
| 4,959,042 | A | | 9/1990 | Taneka et al. | |
| 5,226,339 | A | * | 7/1993 | Donato et al. | 74/375 |
| 5,342,248 | A | | 8/1994 | Matsukara et al. | |
| 5,678,516 | A | | 10/1997 | Sakurai | |
| 5,722,909 | A | | 3/1998 | Thomey | |
| 6,079,385 | A | | 6/2000 | Wicko | |
| 6,109,227 | A | * | 8/2000 | Mott | 123/90.31 |

FOREIGN PATENT DOCUMENTS

| EP | 0713960 | | 5/1996 | |
| GB | 1380631 | | 1/1975 | |
| JP | 61105325 | | 5/1986 | |
| JP | 63-101538 | * | 5/1988 | 74/604 |
| JP | 63-101539 | * | 5/1988 | 74/574 |
| JP | 03-129142 | * | 6/1991 | 74/6 |
| JP | 0420363 B | | 7/1992 | |
| JP | 04-290639 | * | 10/1992 | |

* cited by examiner

*Primary Examiner*—Marcus Charles
(74) *Attorney, Agent, or Firm*—Murgitroyd and Company

(57) ABSTRACT

An engine accessory drive that has a primary drive driveable by a crankshaft of the engine is disclosed. The accessory drive includes a rotational member mounted on a drive shaft and driveable by the primary drive, the drive shaft having an axis of rotation offset from the axis of rotation of the crankshaft. The accessory drive further includes a secondary drive having a flexible continuous secondary drive member external of the engine and driveable by the rotational member, and at least one engine accessory driveable by the secondary drive. The at least one engine accessory includes at least a balance shaft.

16 Claims, 2 Drawing Sheets

ACCESSORY DRIVE FOR DRIVING A BALANCE SHAFT

TECHNICAL FIELD

This invention relates to an accessory drive for driving a balance shaft, to an engine including the balance shaft, and to a method of driving a balance shaft.

BACKGROUND

It is known to provide engines with one or more balance shafts to provide a balancing effect for the engine when in operation. Normally, such balance shafts are positioned on the engine where they can be driven by the engine's front end drive assembly. As a result, the engine designer is restricted as regards where the balance shafts can be located. Furthermore, the overall length of the engine is dictated by this conventional arrangement, with the result that a designer has limited scope for reducing engine dimensions and/or weight.

The present invention sets out to overcome these and other disadvantages of the prior art.

SUMMARY OF THE INVENTION

According to the invention there is provided an engine accessory drive comprising a primary drive drivable by a crankshaft of the engine, a rotational member mounted on a drive shaft drivable by the primary drive, a secondary drive external of the engine and drivable by the rotational member, and at least one engine accessory drivable by the secondary drive, the at least one engine accessory including a balance shaft.

According to the invention there is also provided an engine comprising a crankshaft, a primary drive drivable by the crankshaft, a rotational member mounted on a drive shaft drivable by the primary drive, a secondary drive drivable by the rotational member, and at least one engine accessory drivable by the secondary drive, the at least one engine accessory including a balance shaft.

According to the invention there is also provided a method of driving an engine accessory comprising the steps of providing an engine with a crankshaft, driving a primary drive from the crankshaft, driving a drive shaft from the primary drive, the drive shaft having a rotational member mounted thereon, driving a secondary drive from the rotational member, and driving at least one engine accessory from the secondary drive, the at least one engine accessory including a balance shaft.

BRIEF DESCRIPTION OF THE DRAWINGS

Embodiments of the invention will now be described, by way of example only, with reference to the accompanying diagrammatic drawings, in which.

DETAILED DESCRIPTION

Figure 1:
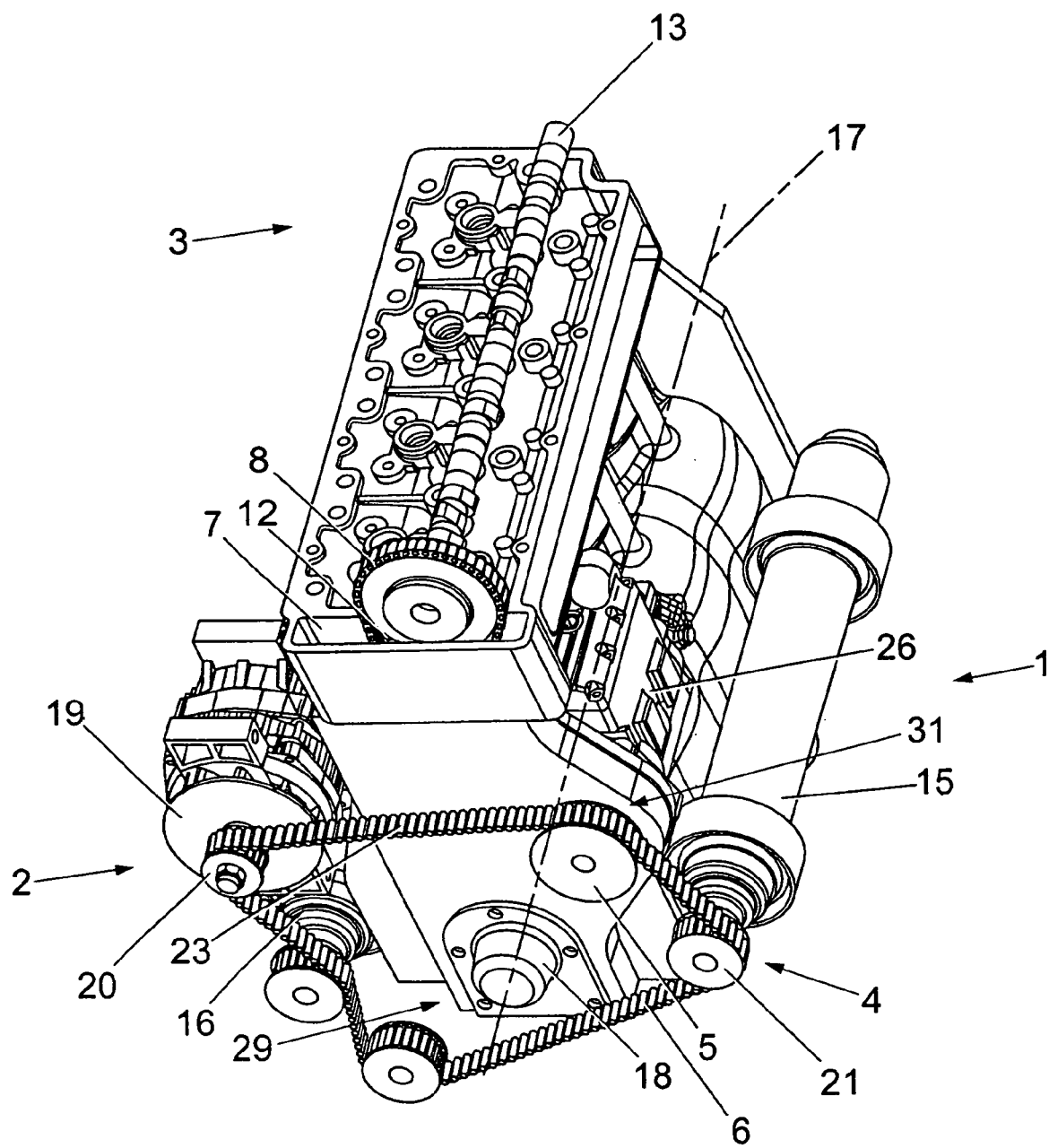
FIG. 1 is an isometric view of an engine having an accessory drive for driving a balance shaft in accordance with the invention.
Figure 2:
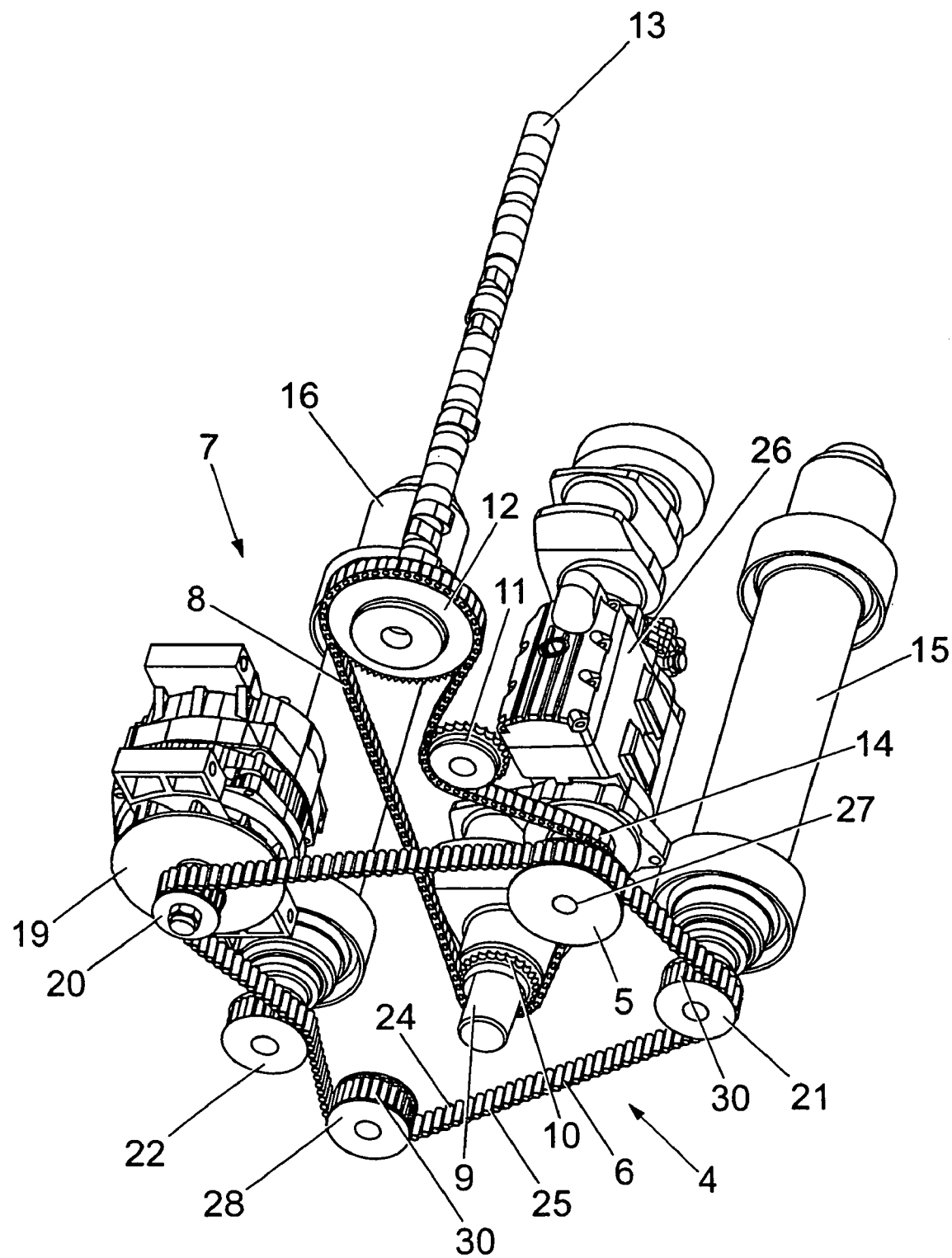
FIG. 2 is an isometric view of the accessory drive and accessories of the engine of FIG. 1.

FIG. 1 shows an engine 1 having a front end 2 and a rear end 3. The front end 2 is provided with an accessory or secondary drive 4 in accordance with the invention and shown in more detail in FIG. 2.

In the illustrated embodiment the accessory drive 4 is made up of a drive pulley 5 and a belt 6 in communication with the drive pulley 5 so that the belt 6 is driven by the drive pulley 5. It is to be understood that any flexible continuous drive member 6 may be used in place of a belt, such as a chain (not illustrated).

The drive pulley 5 is mounted on a drive shaft 27 which in turn is driven by a primary drive in the form of a chain drive 7 within the engine 1. Alternatively, chain drive 7 may be a belt drive, a gear drive, or any other conventional drive. The drive pulley 5 may be replaced by any suitable rotational member.

The chain drive 7 is made up of a drive chain 8, a crankshaft sprocket 10 mounted on a crankshaft 9 towards the front end 2 of the engine 1, an idler sprocket 11 and a camshaft sprocket 12 mounted on a camshaft 13 at the front end 2 of the engine 1. The drive chain 8 extends between the crankshaft sprocket 10, the idler sprocket 11, the camshaft sprocket 12 and a drive sprocket 14 to drive the drive pulley 5.

More particularly, the drive sprocket 14 is disposed on the drive shaft 27 which is in turn in direct communication with a common rail fuel pump 26 so that rotation of the drive sprocket 14 results in rotation of the drive shaft 27 to drive a common rail fuel pump 26. Accordingly, the common rail fuel pump 26 is driven by the crankshaft 9 via the chain drive 7. The drive pulley 5 is therefore driven simultaneously with the common rail fuel pump 26. Typically, the common rail fuel pump 26 is driven at faster than engine speed e.g. up to one and a half times or twice engine speed. The drive shaft 27 has an axis of rotation which is offset from the axis of rotation of the crankshaft 9.

As will be appreciated by those skilled in the art, the common rail fuel pump 26 is optional and the drive shaft 27 could be in communication with an alternative accessory type or a stand-alone shaft. However, in general, the drive shaft 27 is rotatable at engine speed or greater.

The common rail fuel pump 26 can be any other accessory e.g. an alternator, fan, power steering pump, air conditioning pump, oil pump or the like.

A rotary seal is provided on the drive shaft 27 between the engine 1 and the drive pulley 5 at a location generally indicated by the reference numeral 31 to prevent engine oil leakage or dirt ingress.

Drive from the crankshaft 9 is transmitted to the drive pulley 5 via the drive chain 8 to drive the belt 6 which can in turn drive engine accessories as shall be explained more fully below.

Preferably, the primary chain drive 7 is located within the engine 1 while the secondary accessory drive 4 is located substantially externally of the engine 1.

In the present embodiment of the invention, the engine 1 is provided with engine accessories in the form of first and second tubular balance shafts 15, 16 externally mounted on the engine 1. The balance shafts 15, 16 are offset vertically with respect to a centreline 17 of the crankshaft 9 i.e. the balance shaft 16 is set lower than the centreline 17 of the crankshaft 9 and the balance shaft 15 is set higher than the centreline 17. A balance shaft design that may be used with this invention is illustrated in commonly-owned British Patent Application No 0106852.7 filed on Mar. 20, 2001.

The crankshaft 9 is covered by a crankshaft cover plate 18 to enclose the crankshaft 9.

The drive pulley 5 is disposed adjacent the first balance shaft 15 above the centreline 17.

A further front end engine accessory in the form of an alternator 19 is disposed over the second balance shaft 16 on the engine 1 and is provided with an alternator pulley 20 for receiving the belt 6. The first and second balance shafts 15, 16 are provided with first and second balance shaft pulleys 21, 22 respectively in communication with the belt 6 to drive the first and second balance shafts 15, 16.

The belt 6 is a synchronous belt having teeth 23 on a top face 24 and a bottom face 25 thereof. The belt 6 extends between the drive pulley 5, the alternator idler pulley 20, the first balance shaft pulley 21 and the second balance shaft pulley 22 so that the drive pulley 5 can effect contra-rotation of the first and second balance shafts 15, 16 via the belt 6.

At least the drive pulley 5 and the balance shaft pulleys 21,22 are synchronous drive pulleys to ensure correct rotational phasing of the balance shaft rotational elements (not shown) in relation to the phase angle of the crankshaft 9.

The effective diameters of the pulleys are configured such that the crankshaft 9, via the internal chain drive 7 and drive pulley 5, drives the first and second balance shafts 15, 16 at twice engine speed and the alternator 19 at an appropriate design speed.

Selection of a drive shaft 27 rotatable at engine speed or greater reduces the speed step-up required to rotate the balance shafts 15,16 at twice engine speed (which speed would be required in an in-line four-cylinder engine for correct functioning of the balance shafts), therefore the driving load transmitted by belt 6 will be correspondingly lower than if shaft 27 is rotatable at less than engine speed. As an example, the camshaft 13 is rotatable at half engine speed in a four-stroke engine and is therefore unlikely to be suitable as the drive shaft for drive pulley 5 since a large speed step-up would be required.

In the present embodiment of the invention the front end 2 of the engine is also provided with a bottom idler pulley 28 below the second balance shaft 16 to ensure a peripheral engagement of the belt 6 with the balance shaft pulley 22 which is sufficient to transfer the driving force. The alternator 19 is optional and the alternator pulley 20 can simply be an upper idler pulley 20.

As indicated above, the belt 6 is a double-sided synchronous (toothed) belt so that the belt 6 can engage with complementary pulley teeth 30 on at least the first balance shaft pulley 21, second balance shaft pulley 22 and the drive pulley 5.

It will be appreciated by those skilled in the art that any number of front end accessories may be driven by the belt 6 via suitable pulleys.

INDUSTRIAL APPLICABILITY

The invention finds application in machines where improved noise reduction and reduced vibration is required. The invention also provides the opportunity to improve engine oil sealing and reduce engine length.

The primary drive can be substantially contained within the engine while the accessory drive 4 can be external to the engine 1. Accordingly, as the drive for the engine accessories is taken from the drive pulley 5 via the belt 6, no conventional external drive is required to be taken directly from the front end of the crankshaft 9 on the engine 1. Accordingly, noise and vibration in the engine 1 of the invention is reduced. It is estimated that the reduction in noise can be as much as 25% or greater over engines having a conventional front end drive assembly. In addition, no rotary seal is required at the front end of the crankshaft 9.

An engine 1 having balance shafts 15,16 driven as previously described can also be made shorter in the longitudinal direction as compact gearing and sealing arrangements can be employed to drive the balance shafts 15, 16. Such a reduction in length can provide significant cost advantages and advantages in designing and manufacture of the engine 1.

The reduction in length of the engine is further facilitated due to the absence of mechanical linkages at the front end or nose of the crankshaft 9 so that the crankshaft cover plate 18 can be provided with its own seal or accessories mounted on the crankshaft nose can be provided with their own seals which can be more compact than seals normally required between mechanical linkages at the nose of the crankshaft 9.

The rotary seal provided on the sprocket shaft 27 ensures sealing of the engine 1.

Moreover, as the nose of the crankshaft 9 is liberated, the nose is made available for driving other engine accessories if required e.g. AC/DC generators, hydraulic pumps, compressors, engine speed generators, transfer gear boxes and the like.

In addition, where the engine 1 is provided with first and second balance shafts 15, 16 as hereinbefore described, the engine can have a lighter weight than conventional engines fitted with balance shafts driven by mechanical linkages at the nose of the crankshaft 9.

It is envisaged that the balance shafts 15, 16 could be mounted externally of the engine 1, but suspended underneath an oil sump 29 to be below the crankshaft 9. Such an arrangement allows the width of the engine 1 to be reduced (where the engine 1 is being used to power a machine, the width of the engine 1 can be critical as turning of the front wheels of the machine for steering can cause the wheels to engage the engine 1).

Although the balance shafts 15, 16 are shown as being integral with the engine 1, they need not be, and could be mounted on a flange cast onto the engine block. As the balance shafts 15, 16 are driven by the accessory drive 4, an engine designer has a greater freedom regarding location of the balance shafts 15, 16 on the engine 1. Thus, the designer can take into account the space that is available and select a position that provides optimum balancing effect as the balance shafts 15, 16 do not require to be placed where they must engage with the gearing of the front end drive assembly.

The belt 6 can also be directed using idler pulleys to substantially any configuration.

In an alternative embodiment of the invention, the balance shafts 15, 16 can be in communication with additional engine accessories at the rear end 3 of the engine 1 to facilitate transfer of the drive from the accessory drive to the additional engine accessories at the rear end.

Modifications and improvements may be made to the foregoing without departing from the scope of the present invention.

The invention claimed is:

1. An engine accessory drive comprising:
   a primary drive driveable by a crankshaft of the engine,
   a rotational member mounted on a drive shaft driveable by the primary drive, the drive shaft having an axis of rotation offset from the axis of rotation of the crankshaft, a second drive including a flexible, continuous secondary drive member external of the engine and driveable by the rotational member, and at least one engine accessory driveable by the secondary drive, the at least one engine accessory including at least a balance shaft.

2. An engine accessory drive as claimed in claim 1 wherein the at least one engine accessory includes first and second balance shafts arranged for contrarotation at twice engine speed.

3. An engine accessory drive as claimed in claim 2 wherein the secondary drive member includes a synchronous drive belt.

4. An engine accessory drive as claimed in claim 2 wherein the drive shaft is rotatable at engine speed or greater.

5. An engine accessory drive as claimed in claim 2 wherein the primary drive includes one of a belt drive, a chain drive, and a gear drive.

6. An engine accessory drive as claimed in claim 1 wherein the secondary drive member includes a synchronous drive belt.

7. An engine accessory drive as claimed in claim 1 wherein the drive shaft is rotatable at engine speed or greater.

8. An engine accessory drive as claimed claim 1 wherein the primary drive includes one of a belt drive, a chain drive, and a gear drive.

9. An engine accessory drive as claimed in claim 1 wherein the at least one engine accessory includes first and second balance shafts arranged for contrarotation at twice engine speed, and wherein the drive shaft is rotatable at engine speed or greater.

10. An engine accessory drive as claimed in claim 1 wherein the at least one engine accessory includes first and second balance shafts arranged for contrarotation at twice engine speed, wherein the drive shaft is rotatable at engine speed or greater, and wherein the primary drive includes one of a belt drive, a chain drive, and a gear drive.

11. An engine comprising:
a crankshaft,
a primary drive driveable by the crankshaft,
a rotational member mounted on a drive shaft driveable by the primary drive, the drive shaft having an axis of rotation offset from the axis of rotation of the crankshaft,
a second drive including a flexible, continuous secondary drive member driveable by the rotational member, and
at least one engine accessory driveable by the secondary drive, the at least one engine accessory including at least a balance shaft.

12. An engine as claimed in claim 11 wherein the at least one engine accessory includes first and second balance shafts arranged for contra-rotation at twice engine speed.

13. An engine accessory drive as claimed in claim 11 wherein the drive shaft is rotatable at engine speed or greater.

14. An engine accessory drive as claimed in claim 11 wherein the primary drive includes one of a belt drive, a chain drive, and a gear drive.

15. A method of driving an engine accessory comprising the steps of:
providing an engine with a crankshaft,
driving a primary drive from the crankshaft,
driving a drive shaft from the primary drive, the drive shaft having a rotational member mounted thereon,
driving a second drive including a flexible, continuous secondary drive member from the rotational member, and
driving at least one engine accessory from the secondary drive, the at least one engine accessory including at least a balance shaft.

16. A method as claimed in claim 15, wherein the drive shaft rotates at a speed of rotation greater than or equal to the speed of rotation of the crankshaft.

* * * * *